(12) United States Patent
Lee et al.

(10) Patent No.: US 10,326,122 B2
(45) Date of Patent: Jun. 18, 2019

(54) RECHARGEABLE BATTERY

(71) Applicant: SAMSUNG SDI CO., LTD., Yongin-si, Gyeonggi-do (KR)

(72) Inventors: Ji-Woon Lee, Yongin-si (KR); Eun-Young Goh, Yongin-si (KR); Jin-Hyon Lee, Yongin-si (KR); Sang-In Park, Yongin-si (KR); Sung-Yong Kim, Yongin-si (KR); Jin-Seon Shin, Yongin-si (KR); Jong-Ki Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 141 days.

(21) Appl. No.: 15/292,387

(22) Filed: Oct. 13, 2016

(65) Prior Publication Data

US 2017/0117526 A1    Apr. 27, 2017

(30) Foreign Application Priority Data

Oct. 23, 2015 (KR) .......................... 10-2015-0148211

(51) Int. Cl.
| | |
|---|---|
| *H01M 2/24* | (2006.01) |
| *H01M 2/08* | (2006.01) |
| *H01M 2/30* | (2006.01) |
| *H01M 2/02* | (2006.01) |
| *H01M 2/06* | (2006.01) |
| *H01M 2/26* | (2006.01) |
| *H01M 10/04* | (2006.01) |

(52) U.S. Cl.
CPC ............ *H01M 2/24* (2013.01); *H01M 2/022* (2013.01); *H01M 2/027* (2013.01); *H01M 2/06* (2013.01); *H01M 2/08* (2013.01); *H01M 2/263* (2013.01); *H01M 2/30* (2013.01); *H01M 10/0422* (2013.01); *H01M 2220/30* (2013.01)

(58) Field of Classification Search
None
See application file for complete search history.

(56) References Cited

U.S. PATENT DOCUMENTS

| | | | | |
|---|---|---|---|---|
| 2003/0162088 A1* | 8/2003 | Nakanishi | ........... | H01M 2/0285 429/128 |
| 2005/0244706 A1* | 11/2005 | Wu | ..................... | H01M 2/0413 429/56 |
| 2008/0026288 A1* | 1/2008 | Marple | ................. | H01M 2/023 429/178 |

(Continued)

FOREIGN PATENT DOCUMENTS

| | | | | |
|---|---|---|---|---|
| JP | 2005-085556 | * | 3/2005 | ............. H01M 2/26 |
| JP | 2008-243704 | * | 10/2008 | ........... H01M 10/36 |

(Continued)

*Primary Examiner* — Alix E Eggerding
(74) *Attorney, Agent, or Firm* — Lee & Morse, P.C.

(57) ABSTRACT

A rechargeable battery includes an electrode assembly including a first electrode, a second electrode, and a separator interposed therebetween, a center pin at a center of the electrode assembly, the center pin including a bonding portion electrically coupled to the first electrode, and a terminal portion connected to one end of the bonding portion, a case housing the electrode assembly, and a gasket insulating between the center pin and the case, the gasket enclosing an edge of the terminal portion of the center pin.

17 Claims, 8 Drawing Sheets

(56) References Cited

U.S. PATENT DOCUMENTS

2010/0136387 A1* 6/2010 Kohn .................... H01M 2/027
                                                            429/56
2016/0260999 A1* 9/2016 Park .................. H01M 10/0431

FOREIGN PATENT DOCUMENTS

KR   10-2010-0002633 A   1/2010
KR   10-2013-0091532 A   8/2013

* cited by examiner

RECHARGEABLE BATTERY

CROSS-REFERENCE TO RELATED APPLICATION

Korean Patent Application No. 10-2015-0148211, filed on Oct. 23, 2015, in the Korean Intellectual Property Office, and entitled: "Rechargeable Battery," is incorporated by reference herein in its entirety.

BACKGROUND

1. Field

The described technology relates generally to a rechargeable battery, and more particularly, to a pin type of rechargeable battery.

2. Description of the Related Art

Rechargeable batteries can be classified into small-sized cylindrical types, small-sized prismatic types, large-sized prismatic types, etc., depending on their sizes and capacities. With technology development and a demand for mobile devices, demand for small-sized cylindrical rechargeable batteries and small-sized prismatic rechargeable batteries as an energy source has been increasing.

A rechargeable battery typically includes an electrode assembly formed by disposing electrodes at opposite sides of a separator and then winding them in a jelly-roll form, a case for housing the electrode assembly, and a cap assembly for closing and sealing an opened side of the case. Most of currently used rechargeable batteries are cylindrical types, prismatic types, or pouch types of rechargeable batteries. Depending on a kind of exterior member, these rechargeable batteries may be classified into a pouch type, a cylindrical type, or a prismatic type.

A rechargeable battery is manufactured by placing an electrode assembly consisting of a negative electrode, a positive electrode, and a separator inside a metal can having a cylindrical or prismatic shape or a pouch type of case made of an aluminum laminate sheet, and then injecting an electrolyte into the electrode assembly. As described above, a certain amount of space for housing the electrode assembly is required in the case, but an ultra-small pin type of rechargeable battery has a limited space for housing the electrode assembly.

SUMMARY

Embodiments provide a rechargeable battery with a maximized battery capacity and a maximized space for housing an electrode assembly of an ultra-small pin type of rechargeable battery.

A rechargeable battery according to an exemplary embodiment includes an electrode assembly having a first electrode, a second electrode, and a separator interposed therebetween, a center pin at a center of the electrode assembly, the center pin including a bonding portion electrically coupled to the first electrode, and a terminal portion connected to one end of the bonding portion, a case housing the electrode assembly, and a gasket insulating between the center pin and the case, the gasket enclosing an edge of the terminal portion of the center pin.

The gasket may be positioned between the terminal portion and the case to close and seal an opening of the case.

The gasket may include a first insulating portion positioned between a lateral surface of the terminal portion and the case, and a second insulating portion that overlaps a top surface of the terminal portion and has an opening for exposing the top surface thereof.

The gasket may further include a third insulating portion that overlaps a bottom surface of the terminal portion and has an opening through which the bonding portion penetrates.

The gasket may further include a fourth insulating portion that is formed along one end of the second insulating portion positioned on the top surface of the terminal portion and protrudes in a direction perpendicular to the top surface of the terminal portion.

The case may include: a first plate erected in a direction parallel to the bonding portion; a second plate connected to one lower end of the first plate and forming a space for housing the electrode assembly; and a third plate connected to one end of the first plate thereon and having an opening for exposing the terminal portion.

The third plate may contact and overlap the second insulating portion.

A width of the opening of the second insulating portion may be smaller than or equal to a width of the opening of the third plate.

The case may further include a fixing member which is fixedly mounted on one surface of the second plate and into which the bonding portion is inserted.

The case may be made of a conductive material.

The second electrode may be electrically coupled to the case.

The first and second electrodes may respectively include electrode regions where an active material is coated and electrode uncoated regions where an active material is not coated, the electrode uncoated region of the first electrode may be electrically coupled to the bonding portion, and the electrode uncoated region of the second electrode may be electrically coupled to the case.

The case may further include a beading portion that is depressed toward the gasket.

The gasket may be at least on two different surfaces of the terminal portion of the center pin.

The gasket may continuously extend along a lateral surface of the terminal portion and a portion of an upper surface of the terminal portion.

An upper portion of the case may overlap lateral surfaces of the terminal portion, the gasket completely separating between the terminal portion and the case.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

In addition, unless explicitly described to the contrary, the word "comprise" and variations such as "comprises" or "comprising" will be understood to imply the inclusion of stated elements but not the exclusion of any other elements.

Figure 1:
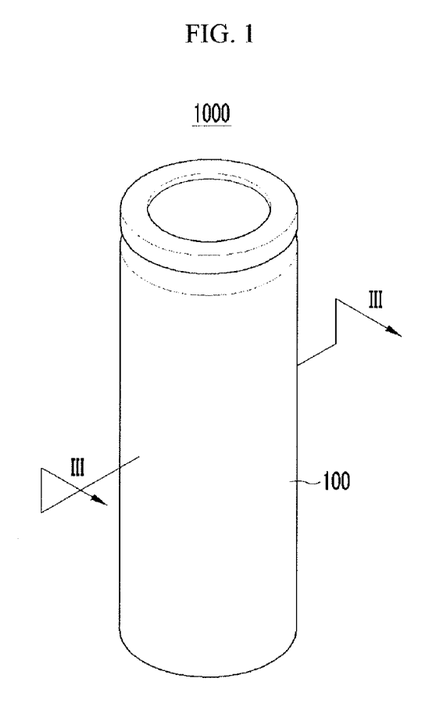
FIG. 1 illustrates a perspective view of a rechargeable battery according to an exemplary embodiment.
Figure 2:
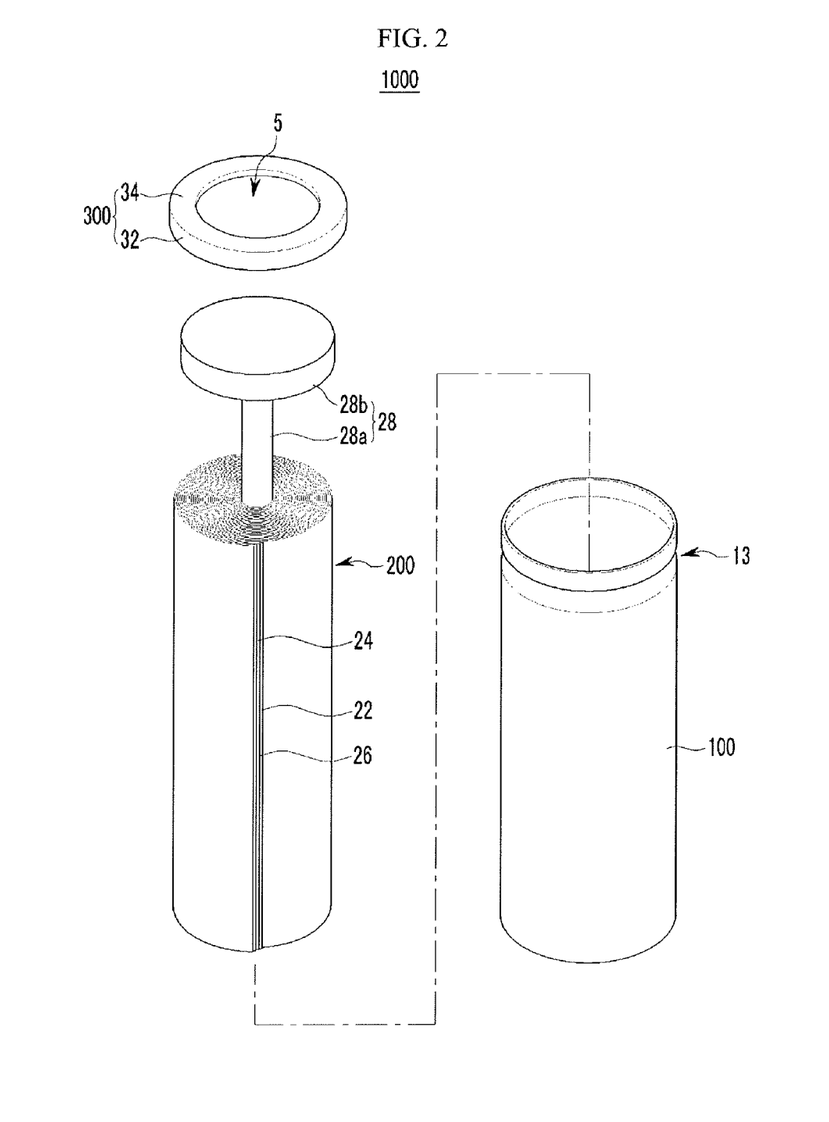
FIG. 2 illustrates an exploded perspective view of the rechargeable battery illustrated in FIG. 1.

FIG. 1 is a perspective view of a rechargeable battery according to an exemplary embodiment, and FIG. 2 is an exploded perspective view of the rechargeable battery illustrated in FIG. 1.

Referring to FIGS. 1 and 2, a rechargeable battery 1000 according to an exemplary embodiment may include a case 100, an electrode assembly 200 housed in the case 100, and a gasket 300 for sealing between a terminal of the electrode assembly 200 and the case 100.

The case 100, e.g., may be cylindrical, and is formed to house the, e.g., cylindrical, electrode assembly 200. For example, the case 100 may be of an ultra-small pin type having a diameter range of about 2 mm to about 5 mm. The case 100 is made of a conductive material, and may be used as one terminal of the rechargeable battery.

The case 100 may have a beading portion 13 that is concave toward the gasket 300. After the gasket 300 is fitted into, e.g., around, the electrode assembly 200 and is then inserted into the case 100, the beading portion 13 is formed by a clamping process. In this case, the beading portion 13 is formed such that it is depressed inward of the case 100 to closely attach and fix the case 100 to the gasket 300, thereby enhancing sealing performance. Accordingly, the case 100 may be formed of a material for facilitating formation of the beading portion 13, e.g., a metal.

The electrode assembly 200 may include a first electrode 22, a second electrode 24, and a separator 26 interposed therebetween. The electrode assembly 200 may be formed by interposing the separator 26 between the first and second electrodes 22 and 24, and then winding all of them in a jelly-roll form. The electrode assembly 200 may be repeatedly wound several times, and the number of repeated windings may be selected depending on a maximum diameter of the rechargeable battery and thicknesses of the first electrode, the second electrode, and the separator.

Figure 3:
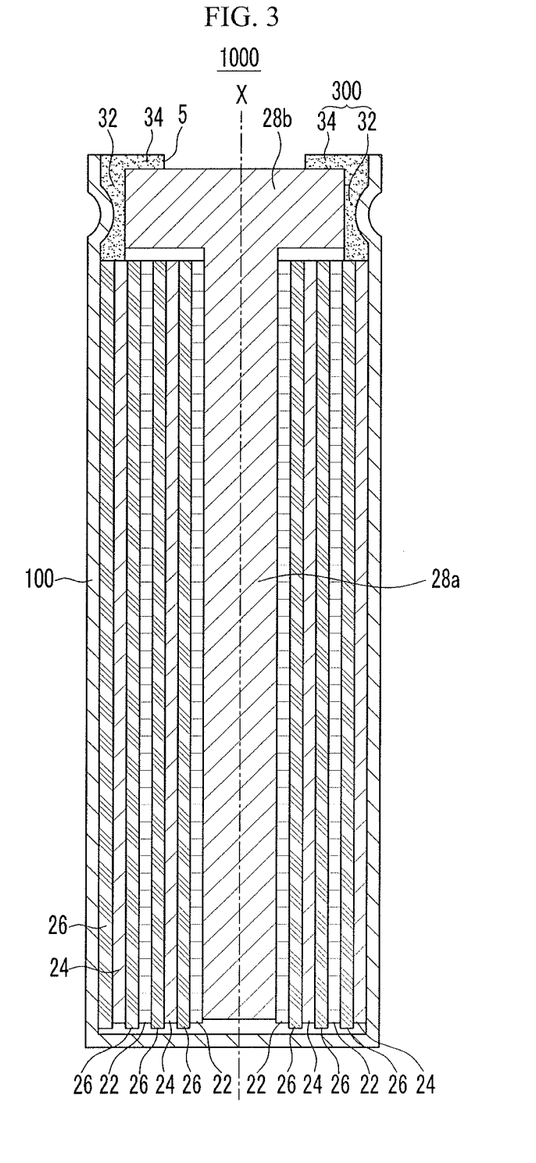
FIG. 3 illustrates a cross-sectional view of FIG. 1 taken along the line III-III.

The electrode assembly 200 will be described in detail with reference to FIGS. 3 and 4. FIG. 3 is a cross-sectional view of FIG. 1 taken along the line and FIG. 4 is an exploded perspective view of the electrode assembly illustrated in FIG. 2 when it is unwound.

Figure 4:
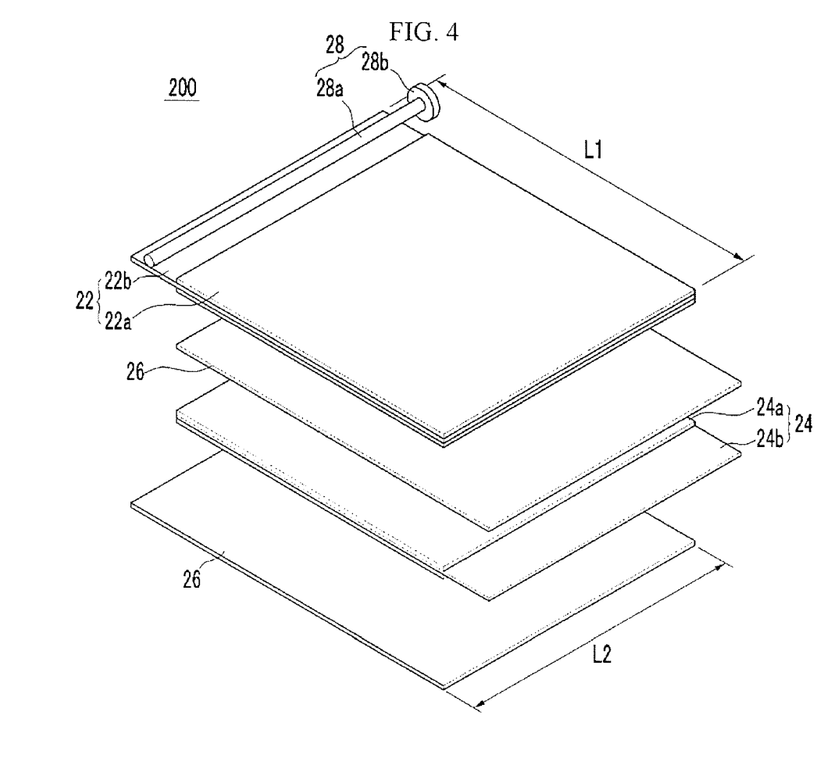
FIG. 4 illustrates an exploded perspective view of the electrode assembly illustrated in FIG. 2 when it is unwound.

Referring to FIGS. 3 and 4, the first and second electrodes 22 and 24 of the electrode assembly 200 include electrode regions 22a and 24a where an active material is coated on a thin plate in the form of a metal foil, and electrode uncoated regions 22b and 24b where an active material is not coated. The first electrode 22 may be a negative electrode, and may be formed by coating an active material, e.g., a carbon-based active material, on a thin metal plate made of copper or the like. The second electrode 24 may be a positive electrode, and may be formed by coating an active material, e.g., a lithium-based active material, on a thin metal plate made of aluminum or the like.

The separator 26 may be made of a porous thin film, or may be made of a polyolefin-based resin. A horizontal width of the separator 26 may be the same as a horizontal width L1 of the first electrode 22 or the second electrode 24, and may be formed shorter to correspond to at least the first electrode region 22a or the second electrode region 24a. However, the horizontal width is not limited thereto, and it may be widely sized such that the first and second electrodes are not short-circuited. In addition, the separator 26 may be formed to have a vertical width which is equal to or greater than a vertical width L2 of the first electrode 22 or the second electrode 24, such that a short-circuit between an end portion of the first electrode 22 and an end portion of the second electrode 24 is not generated.

The electrode assembly 200 may be housed in the case 100 along with the electrolyte, and the electrolyte solution may be in a liquid, solid, or gel state. The electrode assembly 200 may further include a rod-shaped center pin 28 that is positioned at a center of the electrode assembly 200 and is extended in a direction parallel to a rotation axis X.

The center pin 28 includes a pillar-shaped bonding portion 28a, and a terminal portion 28b that is positioned at one end of the bonding portion 28a and protrudes in a direction perpendicular to the bonding portion 28a. The bonding portion 28a of the center pin 28 is connected to the first electrode uncoated region 22b by welding (FIG. 4), and may be used as a first terminal of the rechargeable battery. In order to increase a welding area with the first electrode uncoated region 22b, the center pin 28 may be formed to have a portion with a surface that is smooth to contact the first electrode uncoated region 22b.

The second electrode uncoated region 24b of the second electrode 24 is exposed outside of the separator 26, and the exposed second electrode uncoated region 24b may contact and be electrically coupled to an inner surface of the case 100 such that the case 100 is used as a second terminal of the rechargeable battery.

Referring to FIG. 3, the gasket 300 is positioned between the terminal portion 28b and the case 100, and insulates between the terminal portion 28b and the case 100 to prevent a short-circuit therebetween. The gasket 300 is formed of an insulating material having elasticity.

The gasket 300 is formed to enclose an upper edge of the terminal portion 28b. That is, the gasket 300 includes a first insulating portion 32 that contacts a lateral surface of the terminal portion 28b, and a second insulating portion 34 that is connected to one end of the first insulating portion 32 and has an opening 5. The second insulating portion 34 is formed along an edge of the terminal portion 28b, e.g., along an edge of an upper surface of the terminal portion 28b, and exposes a top surface of the terminal portion 28b via the opening 5. As in the exemplary embodiment, when the gasket 300 is formed to be positioned between the terminal portion 28b and the case 100 and to enclose the terminal portion 28b of the center pin 28, a short-circuit between the terminal portion 28b and the case 100 having opposite polarities can be prevented while minimizing a size of the gasket 300.

FIGS. 5 to 8 are cross-sectional views of other exemplary embodiments, i.e., cross-sectional views of FIG. 1 taken along the line Since the rechargeable batteries illustrated in FIGS. 5 to 8 of other exemplary embodiments are almost the same as those illustrated in FIGS. 1 to 4, only different parts will now be described in detail.

The rechargeable batteries illustrated in FIGS. 5 to 8 include the case 100, the electrode assembly 200 housed in the case 100, and gaskets 300, 302 and 304 positioned between the electrode assembly 200 and the case 100 to seal the electrode assembly 200 inside the case 100.

Figure 5:
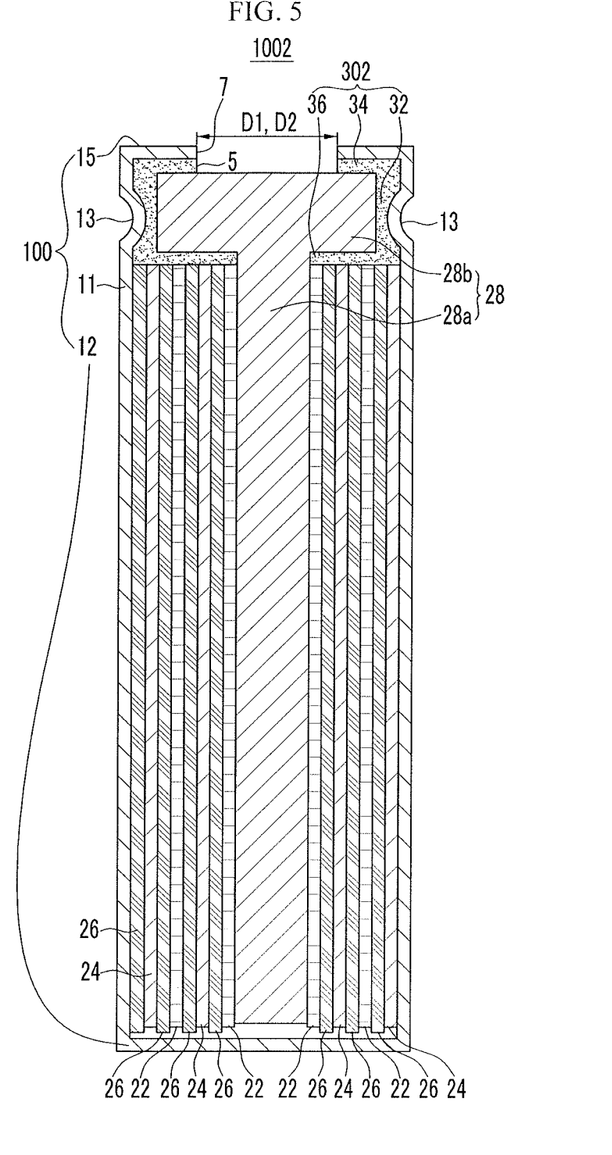
FIGS. 5 to 8 illustrate cross-sectional views of other exemplary embodiments, i.e., cross-sectional views of FIG. 1 taken along the line III-III.

Referring to FIG. 5, a gasket 302 of a rechargeable battery 1002 includes a first insulating portion 32 positioned between the terminal portion 28b of the center pin 28 and the case 100, a second insulating portion 34 overlapping a top surface of the first insulating portion 32 and having the opening 5 for exposing the top surface of the terminal portion 28b, and a third insulating portion 36 positioned to face the second insulating portion 34 by interposing the first insulating portion 32 therebetween. The third insulating portion 36 overlaps a bottom surface of the terminal portion 28b, and has an opening through which the bonding portion 28a of the center pin 28 passes. As such, the gasket 302 illustrated in FIG. 5 may be bent toward the top and bottom surfaces of the terminal portion 28b, and an edge of a protruding portion is inserted into a space formed by bending of the gasket 302.

As further illustrated in FIG. 5, the case 100 may include a first plate 11 erected in a direction parallel to the bonding portion 28a of the center pin, a second plate 12 connected along a lower end portion of the first plate 11 to create a space for housing the electrode assembly 200, and a third plate 15 connected along an upper end portion of the first plate 11 to overlap the second insulating portion 34.

The third plate 15 is positioned on the second insulating portion 34, and is positioned to contact the second insulating portion 34. In this case, the second insulating portion 34 is formed to have a width that is equal to or greater than a width of the third plate 15. That is, one end of the third plate 15 positioned on the terminal portion 28b is not positioned closer to a center than the second insulating portion 34 positioned on the terminal portion 28b, thereby preventing the third plate 15 and the terminal portion 28b from being short-circuited. Accordingly, a width D1 of the opening 5 of the second insulating portion 34 may be smaller than or equal to a width D2 of the opening 7 of the third plate 15.

As such, since an upper end of the case 100 is formed such that it is bent to overlap the second insulating portion 34, the second insulating portion 34 is pressed by the case 100 to increase close adhesion between the terminal portion 28b and the second insulating portion 34, thereby increasing sealing performance.

In addition, the beading portion 13 closely attaching the gasket 302 to the terminal portion 28b by pressing the gasket 302 may be formed in the case 100.

Figure 6:
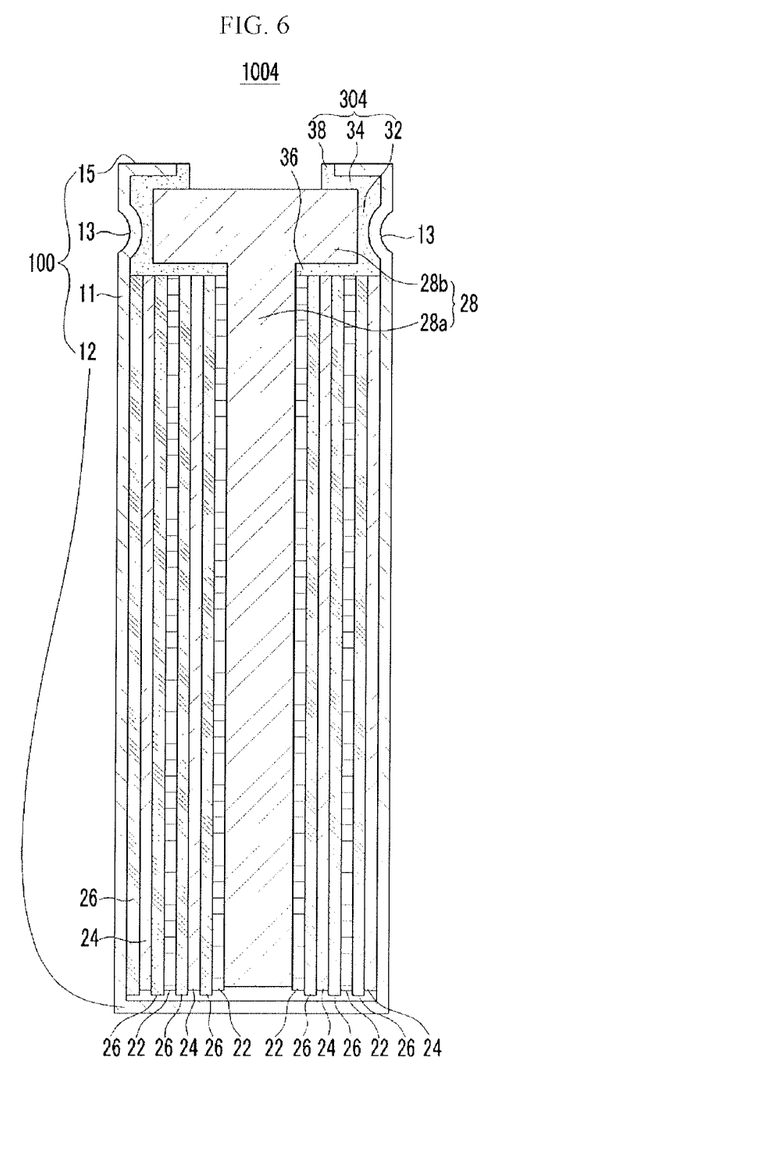

Referring to FIG. 6, the case 100 of a rechargeable battery 1004 may include the first plate 11, the second plate 12, the third plate 15, and a gasket 304. The gasket 304 may include the first insulating portion 32 positioned between the terminal portion 28b and the first plate 11, the second insulating portion 34 positioned at the top surface of the terminal portion 28b and having the opening 5, and the third insulating portion 36 positioned at a bottom surface of the terminal portion 28b and having an opening.

In addition, the gasket 304 includes a fourth insulating portion 38, which is connected along one end of the second insulating portion 34 positioned on the terminal portion 28b and protrudes in a direction perpendicular to the top surface of the terminal portion 28b. In this case, the fourth insulating portion 38 may protrude to have a height that is greater than a thickness of the third plate 15. When the fourth insulating portion 38 is formed as such, a bottom surface of the third plate 15 overlaps the second insulating portion 34 and an end surface of the third plate 15 is enclosed by the fourth insulating portion 38, thereby preventing an end portion of the third plate 15 from being exposed. Accordingly, a short-circuit between the third plate 15 and the terminal portion 28b can be more effectively prevented.

Figure 7:
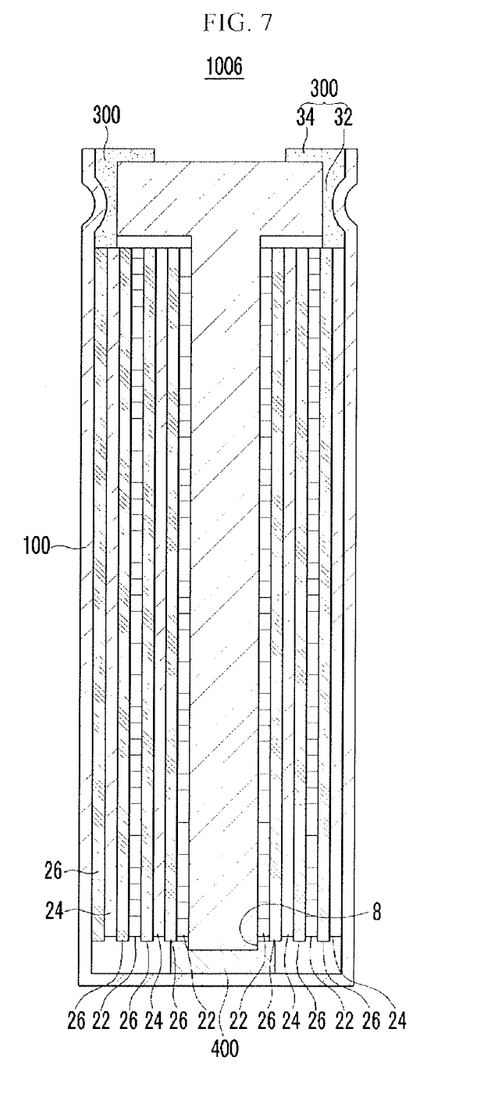
Figure 8:
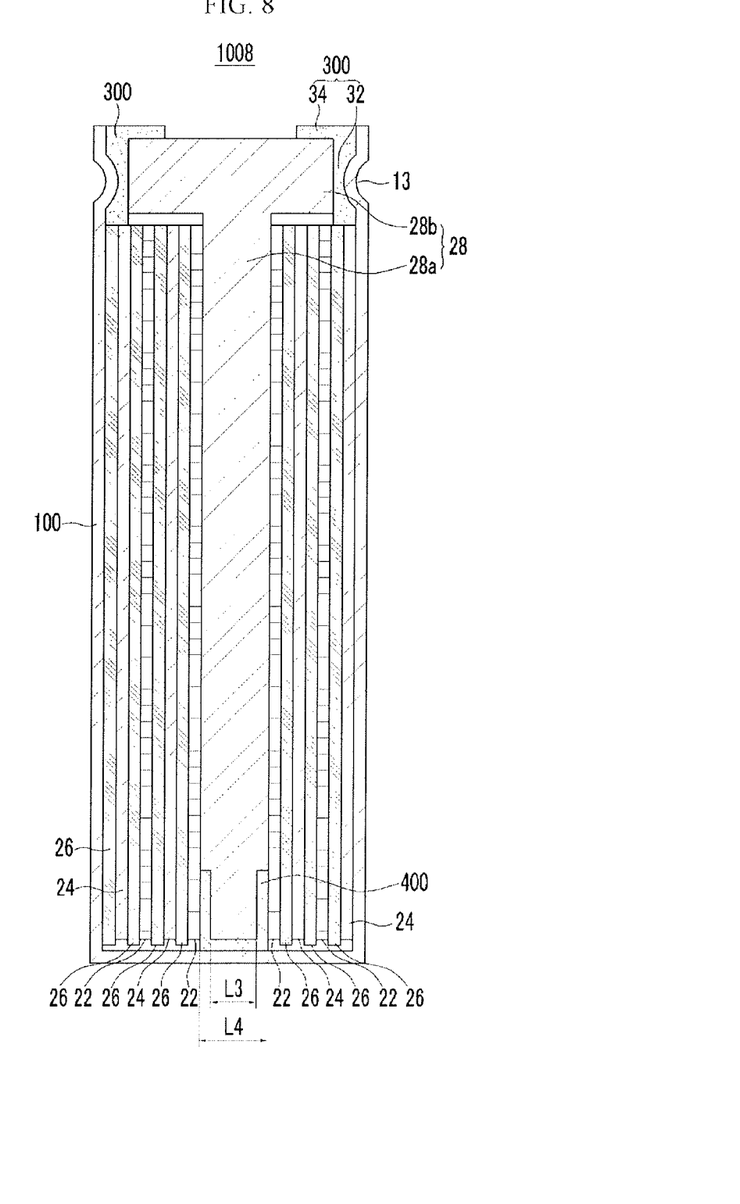

The rechargeable batteries 1006 and 1008 illustrated in FIGS. 7 and 8 further include a fixing member 400 for fixing an electrode assembly 200.

As shown in FIGS. 7 and 8, the fixing member 400 of the rechargeable batteries 1006 and 1008 is positioned on a bottom surface of the case 100, i.e., on the second plate 12, and is fixedly mounted on the second plate 12. The fixing member 400 has a recess portion 8 which is concave in a direction parallel to the bonding portion 28a of the center pin 28, and one end of the bonding portion 28a of the center pin 28 is inserted into the recess portion 8.

The recess portion 8 formed in the fixing member 400 is formed to have the same planar shape as a cross-section of the bonding portion 28a such that the fixing member 400 is closely attached to a surface of the bonding portion 28a. In order to increase close adhesion between the fixing member 400 and the bonding portion 28a, the fixing member 400 should preferably be formed of an elastic material.

As shown in FIG. 7, the bonding portion 28a of the center pin 28 may protrude further than a lower end portion of the jelly roll since it is formed longer by a length to be inserted into the fixing member 400.

In addition, as shown in FIG. 8, the bonding portion 28a of the center pin 28 inserted into the fixing member 400 may be formed to have a smaller width L3 than a width L4 thereof not inserted into the fixing portion 400. The width L3 of the inserted portion may vary according to a thickness of the fixing member 400, and depending on the thickness of the fixing member 400, the width of the inserted portion is reduced such that the fixing member 400 does not protrude toward the electrode from the center pin 28. As such, by reducing the width of the bonding portion inserted into the fixing member 400, a protruding portion is not formed by the fixing member 400, and a lower end of the electrode assembly 200 may be disposed to be closest to the second plate 12 of the case 100.

As shown in FIGS. 7 and 8, when the bonding portion 28a of the center pin 28 is inserted into the fixing member 400, the electrode assembly 200 can be fixed such that it does not move inside the case 1000.

By way of summation and review, when the gasket 300 is formed as in the exemplary embodiment, a short-circuit between the terminal portion 28b and the case 100, which are having opposite polarities, may be prevented. In addition, when the gasket 300 is formed as in the exemplary embodiment, a space for housing the electrode assembly 200 may be relatively maximized even in the same type of rechargeable battery, and thus battery capacity can be maximized, thereby proving a rechargeable battery with a longer service life.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated.

Accordingly, it will be understood by those of skill in the art that various changes in form and details may be made without departing from the spirit and scope of the present invention as set forth in the following claims.

What is claimed is:

1. A rechargeable battery, comprising:
an electrode assembly including a first electrode, a second electrode, and a separator interposed therebetween;
a center pin at a center of the electrode assembly, the center pin including a bonding portion electrically coupled to the first electrode, and a terminal portion connected to one end of the bonding portion;
a case housing the electrode assembly; and
a gasket insulating between the center pin and the case, the gasket enclosing an edge of the terminal portion of the center pin, and the gasket including:
a first insulating portion between a lateral surface of the terminal portion and the case, and
a second insulating portion overlapping a topmost surface of the terminal portion and having an opening for exposing the topmost surface of the terminal portion,
wherein a sidewall of the case extends to a higher level than the center pin, a topmost surface of the sidewall being above the topmost surface of the terminal portion of the center pin, and
wherein the topmost surface of the sidewall of the case is level with a topmost surface of the second insulating portion of the gasket.

2. The rechargeable battery as claimed in claim 1, wherein the gasket is between the terminal portion and the case to close and seal an opening of the case.

3. The rechargeable battery as claimed in claim 1, wherein a topmost surface of the second insulating portion is at a higher level than the topmost surface of the terminal portion relative to the bonding portion of the center pin.

4. The rechargeable battery as claimed in claim 1, wherein the gasket further includes a third insulating portion overlapping a bottom surface of the terminal portion, the third insulating portion including an opening through which the bonding portion penetrates.

5. The rechargeable battery as claimed in claim 1, wherein the gasket further includes a fourth insulating portion along one end of the second insulating portion, the fourth insulating portion being on the top surface of the terminal portion and protruding in a direction perpendicular to the top surface of the terminal portion.

6. The rechargeable battery as claimed in claim 1, wherein the case includes:

a first plate in parallel to the bonding portion;
a second plate connected to a first end of the first plate and defining a space for housing the electrode assembly; and
a third plate connected to a second end of the first plate and having an opening for exposing the terminal portion.

7. The rechargeable battery as claimed in claim 6, wherein the third plate contacts and overlaps the second insulating portion.

8. The rechargeable battery as claimed in claim 7, wherein a width of the opening of the second insulating portion is smaller than or equal to a width of the opening of the third plate.

9. The rechargeable battery as claimed in claim 6, wherein the case further comprises a fixing member on one surface of the second plate, the bonding portion of the center pin being inserted into the fixing member.

10. The rechargeable battery as claimed in claim 1, wherein the case includes a conductive material.

11. The rechargeable battery as claimed in claim 10, wherein the second electrode is electrically coupled to the case.

12. The rechargeable battery as claimed in claim 11, wherein each of the first and second electrodes includes an electrode region with an active material and an electrode uncoated region without an active material, the electrode uncoated region of the first electrode being electrically coupled to the bonding portion, and the electrode uncoated region of the second electrode being electrically coupled to the case.

13. The rechargeable battery as claimed in claim 1, wherein the case further comprises a beading portion depressed toward the gasket.

14. The rechargeable battery as claimed in claim 1, wherein the gasket is at least on two different surfaces of the terminal portion of the center pin.

15. The rechargeable battery as claimed in claim 1, wherein the gasket continuously extends along a lateral surface of the terminal portion and a portion of an upper surface of the terminal portion.

16. The rechargeable battery as claimed in claim 1, wherein an upper portion of the case overlaps lateral surfaces of the terminal portion, the gasket completely separating between the terminal portion and the case.

17. The rechargeable battery as claimed in claim 1, wherein the first insulating portion covers the entire lateral surface of the terminal portion.

* * * * *